United States Patent [19]
Kanno

[11] Patent Number: 5,255,425
[45] Date of Patent: Oct. 26, 1993

[54] METHOD OF MANUFACTURING LAMINATED CORE FOR DYNAMO-ELECTRIC MACHINE

[75] Inventor: Kazunobu Kanno, Toyohashi, Japan

[73] Assignee: Asmo Co., Ltd., Kosai, Japan

[21] Appl. No.: 953,874

[22] Filed: Sep. 30, 1992

[30] Foreign Application Priority Data

Oct. 4, 1991 [JP] Japan .................. 3-283890

[51] Int. Cl.⁵ .............................. H02K 15/02
[52] U.S. Cl. ....................... 29/596; 29/609; 310/42; 310/216
[58] Field of Search .............. 29/596, 598, 609; 310/216, 217, 218, 42

[56] References Cited

U.S. PATENT DOCUMENTS 3,203,077 8/1965 Zimmerle .
3,210,824 10/1965 Zimmerle .
4,333,353 5/1989 Hansen .
4,597,168 7/1986 Oboshi et al. .................. 29/596
4,738,020 4/1988 Neuenschwander .

*Primary Examiner*—Carl E. Hall
*Attorney, Agent, or Firm*—Stanley P. Fisher

[57] ABSTRACT

A method of manufacturing a laminated core for a dynamo-electric machine, having a shaft and a plurality of core sheets with through holes in the center thereof for inserting the shaft therethrough and a plurality of slot holes in the peripheral portion thereof. In the same method, there is provided a construction in which the core sheet is punched so that at least a part of scrap sections to be punched and then removed, including the through hole and the slot holes, is formed as a half die-cut portion, the half die-cut portion formed on the core sheet being fitted to another adjacent core sheet. After the plurality of core sheets are laminated together, the shaft is forced through the through holes and at the same time the half die-cut portions are removed. Therefore, an integration of core sheets is obtained after die-cutting, thereby resulting in easier handling. Further, since the resulting laminated core does not have any joint portion between each of the core sheets, eddy current is reduced and rotation efficiency is improved.

17 Claims, 4 Drawing Sheets

METHOD OF MANUFACTURING LAMINATED CORE FOR DYNAMO-ELECTRIC MACHINE

BACKGROUND OF THE INVENTION

1. Field of the Invention

The present invention relates to a method of manufacturing a laminated core for a dynamo-electric machine and particularly to a method of manufacturing a laminated core for a dynamo-electric machine, in which a core of a dynamo-electric machine such as a small-sized DC motor, a generator, etc. is a plurality of core sheets formed in a stack, and to a laminated core manufactured by use of the same method.

2. Description of the Related Art

Generally, a laminated core has been used in dynamo-electric machines such as a small-sized DC motor, a generator or the like.

In order to form such a laminated core, a plurality of thin core sheets 12 having a circular through hole 10 formed in the center thereof are provided by a die-cutting operation, as indicated in FIG. 4. Next, the plurality of core sheets 12 are disposed in a stacked state in a magazine on a cut-out slider 14 in a position A shown in the same drawing. Thereafter, a predetermined number of core sheets 12 provided in the magazine are placed in a position B. The shaft 16 is then forced into the through holes 10 of the core sheets 12. The predetermined number of core sheets 12 are then laminated together in a stack so as to be disposed in alignment with the shaft 16, thereby allowing a laminated core 18 to be formed.

However, in the case of the above-mentioned method of manufacturing a laminated core, thin plates are first punched by means of a press die and aligned with one another to be conveyed. The shaft 16 must then be forced through the core sheets using rotating and skewing operations for balance purposes. This process, however, requires many steps and much labor making it troublesome. Automating such production is difficult. When an automated process for producing a laminated core is used, it is expensive.

Accordingly, in order to solve the problems in the above-described processes, lamination methods as shown in FIGS. 5 and 6 have been conventionally employed.

FIG. 5A is a plan view of a core sheet. FIG. 5B is a vertical sectional view of FIG. 5A, and FIG. 5C is a vertical sectional view after a shaft has been forced through the core sheets.

In a center portion of a core sheet 20 a through hole 24 is provided for inserting a shaft 22 therethrough. A plurality of slot holes 26 are formed around the periphery of the core sheet 20. On the end of the peripheral portions formed by the slot holes 26, a plurality of protrusions 28 for laminating is formed by press-molding during the die-cutting of the core sheets 20. At the same time the protrusions 28 of each core sheet 20 are fitted with one another so as to laminate the plurality of core sheets 20 together. Thereafter, the shaft 22 is forced through the through holes 24 of the laminated core sheets 20, thereby enabling a laminated core to be formed.

FIGS. 6A, 6B and 6C each correspond to FIGS. 5A, 5B and 5C, respectively. Like elements are given like reference numerals, and hence only the feature portions of FIG. 6 will be explained.

A core sheet 20 is provided with a ring-shaped convex portion 30 formed along the entire inner periphery of a through hole 24 disposed in the center of the core sheet 20. The convex portion 30 is formed by press-molding during punching the core sheet 20 in a manner similar to that in FIG. 5 and is for lamination. At the same time the convex portions 30 of each core sheet 20 are fitted to each other, thereby allowing the plurality of core sheets 20 to be laminated together.

In the above-described conventional methods of manufacturing a laminated core for a dynamo-electric machine, constructions have been provided in which a plurality of protrusions 28 is formed on the end edge of the peripheral portion of a core sheet 20, or a convex portion 30 is formed at the inner periphery of a through hole of the core sheet 20. The protrusions 28 and convex portions 30 are formed by press-molding during die cutting of the core sheet 20, so as to be fitted together with each other. After the core sheets are laminated together, a shaft 22 is forced therethrough. Accordingly, even after the formation of the rotor is completed, the core sheets 20 are connected to each other by the protrusions 28 or the convex portions 30. As a result, a higher degree of adhesion between the core sheets 20 is obtained.

This makes the resistance between the core sheets 12 low, thereby resulting in the generation of iron loss due to an eddy current. Thus, there is a problem in that rotation efficiency, which is an important characteristic of a dynamo-electric machine, will be lowered as compared with that of FIG. 4, in which core sheets 12 are simply laminated to each other.

Also, this conventional method has another problem in that, since space is necessary for forming a protrusion 28 or a convex portion 30 on a part of the core sheet 20, this puts restrictions on the core product configuration with respect to product design.

SUMMARY OF THE INVENTION

In view of the aforementioned problems, it is an object of the present invention to provide a method of manufacturing a laminated core for electric rotating machines, in which inconvenience during rotating and skewing operations for balancing can be resolved, and easy handling and automation made possible. A further object is to improve rotation efficiency by reducing eddy current loss, and to alleviate restrictions placed on the core product configuration.

In order to achieve the above-mentioned object, in accordance with a first aspect of the present invention, there is provided a method of manufacturing a laminated core for a dynamo-electric machine, having a shaft and a plurality of core sheets with through holes in the center thereof for insertion of the shaft therethrough and a plurality of slot holes in the peripheral portion of the core sheets, respectively, comprising the steps of:

(a) die-cutting the core sheet so that at least a part of scrap sections to be punched and then removed, including the through hole and the plurality of slot holes, can be formed as a half die-cut portion;

(b) laminating the core sheet on at least one of core sheets previously die-cut by the step (a), by fitting said respective half die-cut portions formed on each of the core sheets to each other; and (c) after the plurality of core sheets are laminated together, forcing the shaft through the through holes of the core sheets and removing the respective half die-cut portions.

In accordance with a second aspect of the present invention, there is provided a method of manufacturing a laminated core for a dynamo-electric machine, having a shaft and a plurality of core sheets with through holes in the center thereof for insertion of the shaft therethrough, comprising the steps of:

(a) press-molding the core sheet so that at least a part of a portion corresponding to the through hole is formed as a half die-cut portion;

(b) laminating the core sheet on at least one of core sheets previously die-cut by the step (a), by fitting the respective half die-cut portions formed on each of the core sheets to each other; and (c) after the plurality of core sheets are laminated together, forcing the shaft through the through holes of the core sheets, and at the same time removing the respective half die-cut portions so as to form the through hole.

In a method of manufacturing a laminated core for a dynamo-electric machine in accordance with the above-mentioned aspects, there is provided a construction in which at least a part of scrap sections to be punched and then removed, including the through hole and slot holes, is formed as a half die-cut portion, and this half die-cut portion is fitted to another adjacent core sheet so that these core sheets are integrally laminated together. Accordingly, the integrated core sheets can be obtained after the die-cutting process, thereby resulting in easier handling and facilitating conveying automation.

Also, since the half die-cut portion is removed during or after a shaft is forced through a through hole, a joint portion such as a press fit does not exist between each of the core sheets. The resulting rotor is produced in the state in which the core sheets are simply laminated together. Thus, a laminated core, which has reduced eddy current loss and high rotation efficiency, can be obtained.

Furthermore, since the half die-cut portion for laminations of the core sheets is formed by use of scrap sections for die-cutting, it is not necessary to maintain space for the half die-cut portion on the core sheet itself. This enables the free setting of the product configuration without restriction with respect to product design.

BRIEF DESCRIPTION OF THE DRAWINGS

FIG. 1 shows a method of manufacturing a laminated core of a small-sized DC motor according to a first embodiment of the present invention.

FIG. 3 shows a method of manufacturing a laminated core of a small-sized DC motor according to an another embodiment of the present invention.

FIG. 5 shows another conventional method.

FIG. 6 shows a further conventional method.

DESCRIPTION OF THE PREFERRED EMBODIMENTS

The preferred embodiments of the present invention will now be described in detail with reference to the attached drawings.

FIGS. 1 and 2 refer to a method of manufacturing a laminated core for a dynamo-electric machine when manufacturing a small-sized DC motor according to a first embodiment of the present invention.

Figure 1A:
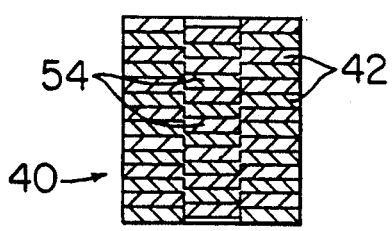
FIG. 1A is a vertical sectional view indicating a laminated state of core sheets.
Figure 1B:
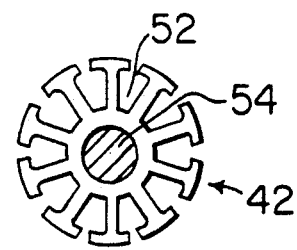
FIG. 1B is a plan view of FIG. 1A.
Figure 1C:
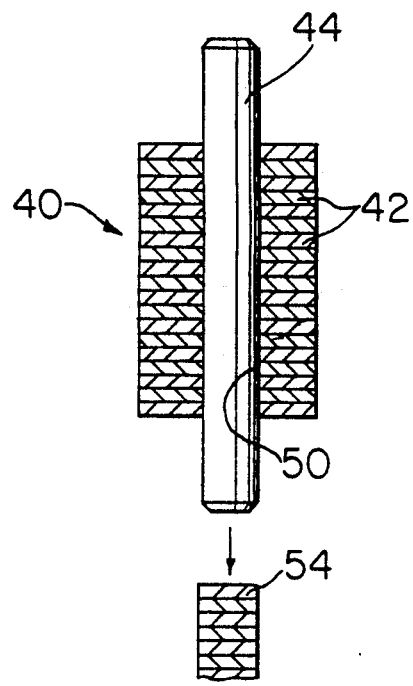
FIG. 1C is a vertical sectional view indicating a state in which a shaft has been forced through a through hole.
Figure 2A:
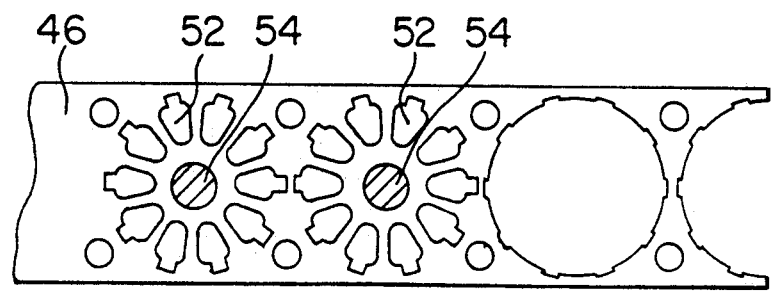
FIG. 2A is a plan view indicating a press-molding state of a thin metal sheet which forms the core sheet, FIG. 2A.
Figure 2B:
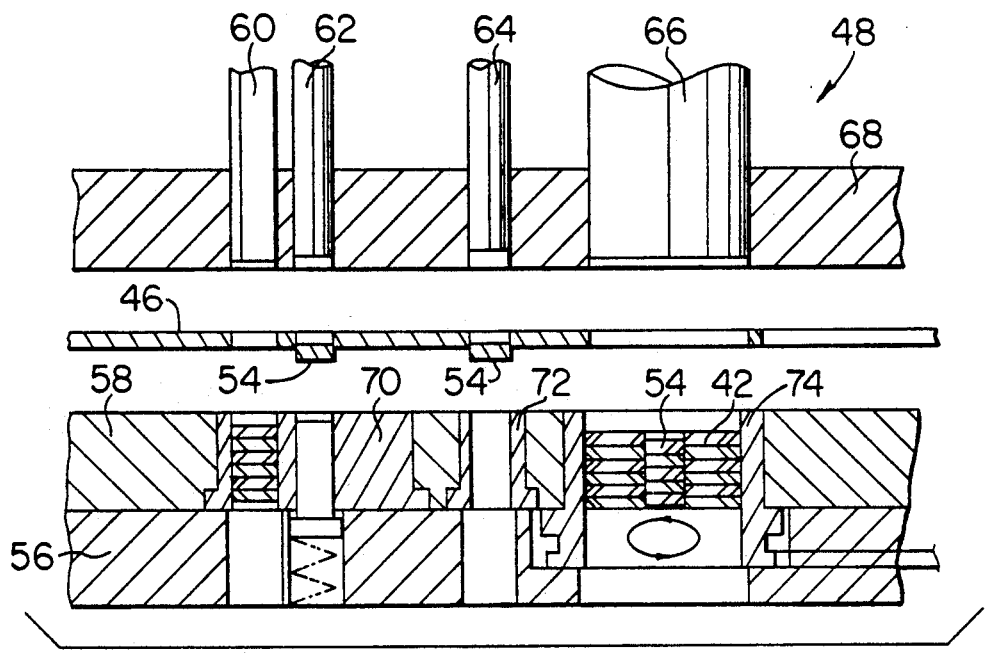
FIG. 2 shows a press-molding state of the core sheet shown in FIG. 1.
FIG. 2C is a partially enlarged view of a half die-cut portion of FIG. 2B.
Figure 2C:
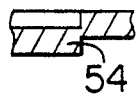

FIG. 1 shows a method of manufacturing a laminated core of a small-sized DC motor according to a first embodiment of the present invention: FIG. 1A is a vertical sectional view indicating a laminated state of core sheets, FIG. 1B is a plan view of FIG. 1A, and FIG. 1C is a vertical sectional view indicating the state in which a shaft has been forced through a through hole. FIG. 2 shows a press-molding state of the core sheet as shown in FIG. 1: FIG. 2A is a plan view indicating a press-molding state of a thin metal sheet which forms the core sheet, FIG. 2B is a cross sectional view of press die as shown in FIG. 2A, and FIG. 2C is a partially enlarged view of a half die-cut portion of FIG. 2B.

A laminated core 40 of a small-sized DC motor is constructed such that a shaft 44 is inserted through a plurality of core sheets 42 so that the plurality of core sheets 42 are laminated together in a stacked state.

Each core sheet 42 is formed by punching a thin metal sheet 46 by use of a progressive die 48. The core sheet 42 formed in this way includes a through hole 50 for inserting the shaft 44 therethrough at the center of the core sheet, and a plurality of slot holes 52 formed radially at the peripheral portion of each core sheet.

The through hole 50 is formed as a half die-cut portion 54 during a die-cutting step of the slot holes 52. During the punching of the outer shape of the core sheet 42, the plurality of core sheets 42 are integrally laminated together by fitting a convex portion and a concave portion of the half die-cut portion 54 with each other. Then, when the shaft 44 is forced into the through hole, the half die-cut portion 54 is removed.

Next, the above-mentioned method of manufacturing a laminated core for a small-sized DC motor is described below with reference to FIG. 2.

First, as shown in FIG. 2B, a thin metal sheet 46 is disposed on a die plate 58 provided on a die base 56 of a progressive die 48. A stripper plate 68 having a slot hole cutting punch 60, a half die-cut punch 62 for a through hole, a through hole cutting punch 64 and an outer shape cutting punch 66 is placed so that the thin metal sheet 46 can be punched, while moving by a predetermined length. Die bushings 70, 72 and 74 are respectively provided in the side of the die plate 58, so as to correspond to the slot hole cutting punch 60, the half die-cut punch 62 for a through hole, the through hole cutting punch 64 and the outer shape cutting punch 66.

Further, as shown in FIG. 2A the slot holes 52 and the half die-cut portions 54 are formed in the thin metal plate 46 by use of the slot hole cutting punch 60 and the half die-cut punch 62 for a through hole, and subsequently the outer shape of the core sheet 42 is punched by use of the outer shape cutting punch 66.

In such a case, the through hole cutting punch 64 operates only on a first core sheet 42 so that the half die-cut portion 54 of the first core sheet 42 is punched, i.e. a projection formed by half die cutting of the lowermost-positioned laminated core sheet 42 is eliminated. Accordingly, since any protrusion does not exist on the respective upper surfaces and lower surfaces of the sets of laminated core sheets 42, the set of laminated core sheets is not formed integrally with the set of previously punched laminated core sheets (not shown) and can be isolated from the set of previously punched laminated core sheets.

Also, when the core sheet 42 is punched by the outer shape cutting punch 66, an upper-positioned core sheet 42 is superposed on a lower-positioned core sheet 42, as shown in FIG. 2B, and a convex portion and a concave portion of the respective half die-cut portions 54 of both core sheets are fitted together, thereby allowing the core sheets 42 to be integrally laminated with each other.

Thus, since the plurality of core sheets 42 are integrally laminated together, facilitation of the handling of the core sheets and automated conveyance are made possible.

Next, the shaft 44 is forced in the position of the half die-cut portion 54 of the plurality of integrally laminated core sheets 42, as shown in FIG. 1C. At the same time, the half die-cut portion 54 is punched and then removed, with the through hole 50 formed therein, so that the plurality of core sheets 42 are integrated with the shaft 44.

Since the half die-cut portion 54 is removed when the shaft 44 is forced through the through hole, at the time of product completion after forcing-in the shaft 44, adhesive coupled portions do not exist between the core sheets 42, with the state being that the core sheets 42 are simply laminated together. This results in the reduction of eddy current loss and a laminated core 40 with high motor efficiency.

Further, since the half die-cut portion 54 is formed in scrap sections to be punched and then removed within the through hole 50, it is not necessary to form any fitting portion in a completed product. Also it is not necessary to maintain extra space in the completed product with respect to product design, thereby enabling free setting of the product configuration.

Figure 3A:
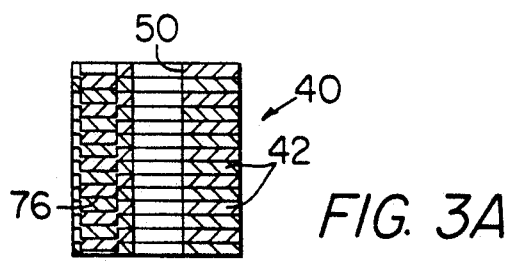
FIG. 3A is a vertical sectional view indicating a state of laminated core sheets.
Figure 3B:
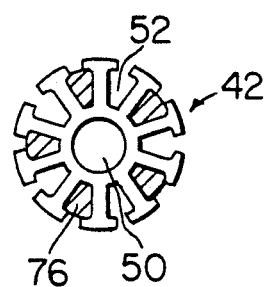
FIG. 3B is a plan view of FIG. 3A.
Figure 3C:
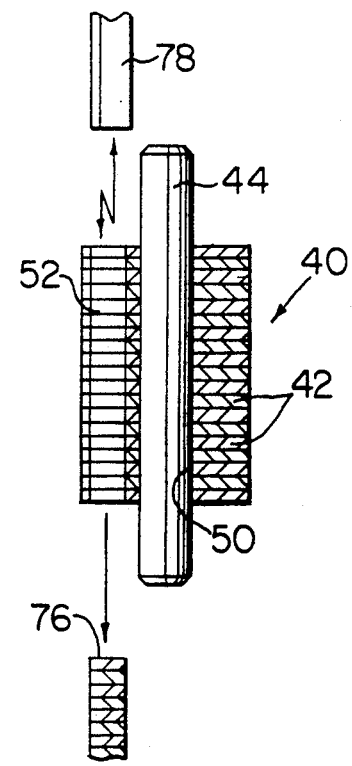
FIG. 3C is a vertical sectional view indicating a state in which a shaft is forced through a through hole.
Figure 4:
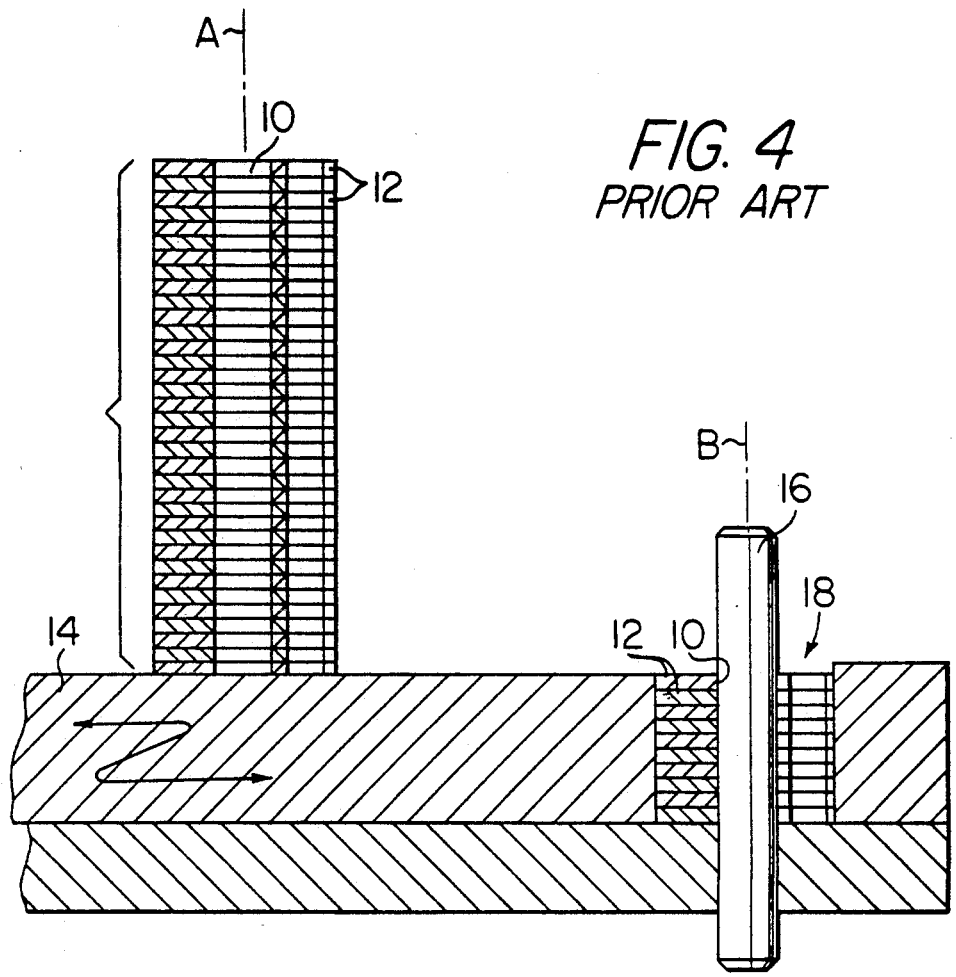
FIG. 4 is a cross sectional view showing a conventional method of manufacturing laminated core sheets.
Figure 5A:
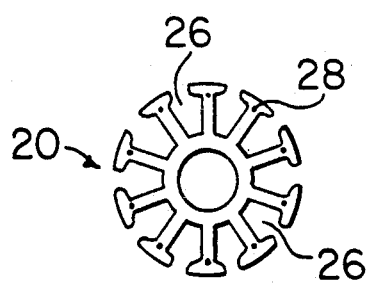
FIG. 5A is a plan view of a core sheet.
Figure 5B:
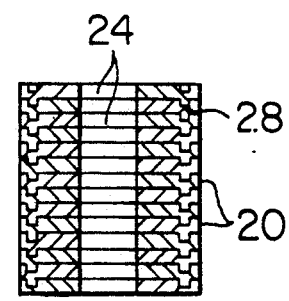
FIG. 5B is a vertical sectional view of FIG. 5A.
Figure 5C:
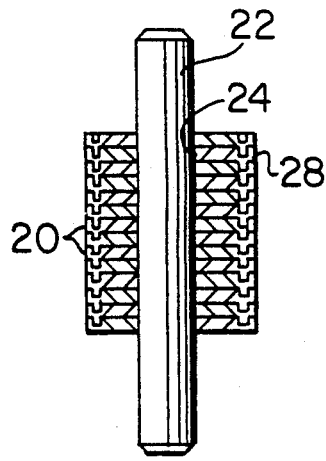
FIG. 5C is a vertical sectional view after a shaft has been forced through a through hole.
Figure 6A:
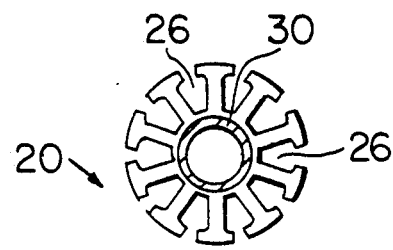
FIG. 6A, FIG. 6B and FIG. 6C each respectively correspond to FIGS. 5A, 5B and 5C.
Figure 6B:
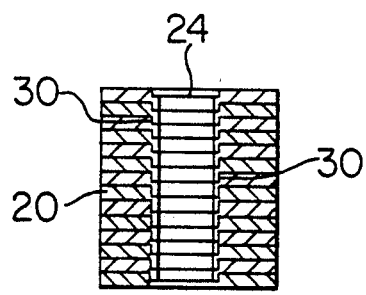
Figure 6C:
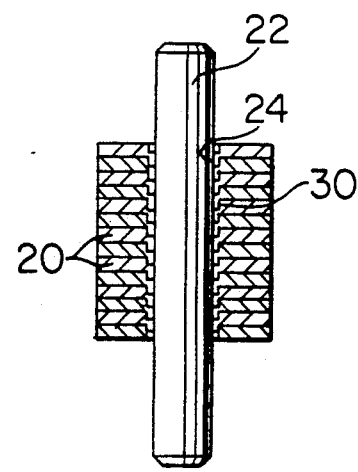

FIG. 3 shows a method of manufacturing a laminated core of a small-sized DC motor according to an another embodiment of the present invention: FIG. 3A is a vertical sectional view indicating a state of laminated core sheets, FIG. 3B is a plan view of FIG. 3A, and FIG. 3C is a vertical sectional view indicating a state in which a shaft is forced through a through hole.

This embodiment is constructed such that a through hole 50 of a core sheet 42 is punched, and a plurality of slot holes 52 provided in the peripheral portion of the core sheet 42 are formed alternately as a die-cut portion and a half die-cut portion 76, the half die-cut portions 76 being fitted to others in the adjacent core sheets at the time of punching the outer shape of the core sheet 42, thereby allowing the plurality of core sheets 42 to be integrally laminated together.

At the same time that the shaft 44 is forced through the through holes 50 of the core sheets 42, the half die-cut portions 76 are punched and removed by means of an extruding jig 78.

Since other constructions and operations of the present invention are identical to the above-described embodiment, a description with respect thereto is omitted.

Incidentally, it is to be understood that the present invention is not limited to the above-described specific embodiments, and that modifications and variations of the invention may be made within the scope of the present inventive concepts.

By way of example, although the invention has been described in its preferred embodiment with a construction in which a motor is employed as a dynamo-electric machine, it is not limited to the same, and may be applied to another type of electric rotating machine such as a generator and the like.

Also, the above-described embodiment has been described and illustrated with a construction in which scrap sections in the through hole 50 or the slot hole 52 are formed as a half die-cut portion, but the invention is not limited to the same and may be applied to a modified construction in which a half die-cut portion is formed in scrap sections in both the through hole 50 and the slot hole 52.

Further, each of the above-described embodiments has been described with a construction for which a simple laminated core is formed, but the present invention is not limited to the same, and may also be applied to a skew laminated core or a rotating laminated core by modifying the construction of the cutting dies.

Still further, although the embodiment of this invention as shown in FIG. 3 is constructed so that the slot hole 52 is formed by punching a half die-cut portion 76 by use of an extruding jig 78 at the time of forcing-in a shaft 44, it is not limited to the same and may be applied to a modified construction in which the half die-cut portion 76 is punched after forcing-in the shaft 44.

What is claimed is:

1. A method of manufacturing a laminated core for a dynamo-electric machine, having a shaft and a plurality of core sheets with through holes in the center thereof for insertion of said shaft therethrough and a plurality of slot holes in the peripheral portion of said core sheets, respectively, comprising the steps of:
    (a) die-cutting said core sheets so that at least a part of scrap sections to be punched and then removed, including said through hole and said plurality of slot holes, can be formed as a half die-cut portion;
    (b) laminating said core sheets on at least one of core sheets previously die-cut by the step (a), by fitting said respective half die-cut portions formed on each of said core sheets to each other; and
    (c) forcing said shaft through said through holes of said core sheets and removing said respective half die-cut portions after said plurality of core sheets are laminated together.

2. A method of manufacturing a laminated core for a dynamo-electric machine according to claim 1, wherein said step (a) and said step (b) are performed repeatedly until said plurality of core sheets are laminated together.

3. A method of manufacturing a laminated core for a dynamo-electric machine according to claim 1, wherein said step (a) comprises the steps of forming said half die-cut portion and at the same time punching and removing scrap sections other than said half die-cut portions, and punching an outer shape of one of said core sheets.

4. A method of manufacturing a laminated core for a dynamo-electric machine according to claim 3, wherein one of said core sheets is automatically laminated to a previously punched core sheet so as to be integrated with said previously punched core sheet after said outer shape of one of said core sheets has been punched and then removed.

5. A method of manufacturing a laminated core for a dynamo-electric machine according to claim 1, wherein said half die-cut portion comprises at least a portion of said through hole, and said portion of said through hole is removed due to a shaft during forcing-in the shaft, so as to form said through hole.

6. A method of manufacturing a laminated core for a dynamo-electric machine according to claim 1, wherein said half die-cut portion comprises at least one of said plurality of slot holes, and said portion is removed at the same time of forcing said shaft through said through hole, so that at least one of said plurality of slot holes is formed.

7. A method of manufacturing a laminated core for a dynamo-electric machine according to claim 1, wherein said half die-cut portion comprises at least one of said plurality of slot holes, and said portion is removed after forcing said shaft through said through hole, so that at least one of said plurality of slot holes is formed.

8. A method of manufacturing a laminated core for a dynamo-electric machine according to claim 1, wherein said half die-cut portion is formed alternately in positions corresponding to said plurality of slot holes.

9. A method of manufacturing a laminated core for a dynamo-electric machine according to claim 1, in said step (a), said scrap sections of a first-positioned core sheet are all punched.

10. A method of manufacturing a laminated core for a dynamo-electric machine, having a shaft and a plurality of core sheets with through holes in the center thereof for insertion of said shaft therethrough, comprising the steps of:
(a) press-molding said core sheets so that at least a part of a portion corresponding to said through hole is formed as a half die-cut portion;
(b) laminating said core sheets on at least one of core sheets previously die-cut by the step (a), by fitting said respective half die-cut portions formed on each of said core sheets to each other; and
(c) forcing said shaft through said through holes of said core sheets, and at the same time removing said respective half die-cut portions so as to form said through hole after said plurality of core sheets are laminated together.

11. A method of manufacturing a laminated core for a dynamo-electric machine according to claim 10, wherein said step (a) and said step (b) are repeatedly performed until said plurality of core sheets are laminated together.

12. A method of manufacturing a laminated core for a dynamo-electric machine according to claim 10, wherein said half die-cut portion is removed by said shaft.

13. A method of manufacturing a laminated core for a dynamo-electric machine according to claim 10, wherein said step (a) comprises the steps of forming said half die-cut portion and punching an outer shape of one of said core sheets.

14. A method of manufacturing a laminated core for a dynamo-electric machine according to claim 13, wherein one of said core sheets is, after said outer shape thereof is punched, automatically laminated to a previously formed core sheet, so as to be integrated with said previously formed core sheet.

15. A method of manufacturing a laminated core for a dynamo-electric machine according to claim 10, in said step (a), a portion corresponding to said through hole on a first-positioned core sheet, is punched so as to form said through hole.

16. A method of manufacturing a laminated core for a dynamo-electric machine according to claim 10, wherein said plurality of core sheets each further include a plurality of slot holes formed radially in a peripheral portion of each of said core sheets.

17. A method of manufacturing a laminated core for a dynamo-electric machine according to claim 10, wherein said dynamo-electric machine is one of a generator and a motor.

* * * * *